United States Patent
Ng et al.

(10) Patent No.: US 8,801,502 B2
(45) Date of Patent: Aug. 12, 2014

(54) IN-SITU AIRFOIL CONTOURING TOOL

(75) Inventors: Henry Ng, Cincinnati, OH (US); Daniel O'Reilly, Mason, OH (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 13/407,302

(22) Filed: Feb. 28, 2012

(65) Prior Publication Data

US 2013/0225055 A1    Aug. 29, 2013

(51) Int. Cl.
*B24B 9/00*    (2006.01)

(52) U.S. Cl.
USPC ............. 451/48; 451/349; 451/348; 451/420; 451/438

(58) Field of Classification Search
CPC .......... B24B 9/00; B24B 19/14; B24B 23/00; B24B 23/08; B24B 1/00; B24B 5/00; B24B 29/00; B24B 41/00; B24B 49/00; B24D 5/66; B23P 5/66; B23C 1/20; B23C 3/00; B23C 3/002; B23C 3/12; B23C 3/126; B23C 3/18; B23C 3/16; B23C 2215/04; B23C 2215/045; B23C 2215/12; B23C 2215/44; B23Q 1/40; B23Q 16/00
USPC .......... 451/349, 391, 420, 438, 440; 409/132, 409/180, 175, 296, 298; 29/889.1
See application file for complete search history.

(56) References Cited

U.S. PATENT DOCUMENTS

| | | | | |
|---|---|---|---|---|
| 2,616,231 A * | 11/1952 | Murray | ............... | 451/438 |
| 2,680,392 A * | 6/1954 | Gaved | ............... | 72/102 |
| 2,735,247 A * | 2/1956 | Hohzhauzen et al. | ........ | 451/438 |
| 2,905,062 A | 9/1959 | Praeg | | |
| 2,972,840 A * | 2/1961 | Ludwig | ............... | 451/422 |
| 2,993,312 A * | 7/1961 | Holland et al. | ............... | 451/549 |
| 4,001,978 A | 1/1977 | Hales | | |
| 4,639,991 A * | 2/1987 | Sharon | ............... | 29/889.7 |
| 4,788,797 A * | 12/1988 | Kane et al. | ............... | 451/344 |
| 5,251,407 A * | 10/1993 | Afshar | ............... | 451/349 |
| 5,371,977 A * | 12/1994 | Liner | ............... | 451/349 |
| 5,954,464 A * | 9/1999 | Dansereau et al. | ........... | 409/293 |
| 6,106,204 A | 8/2000 | Dansereau | | |
| 6,183,355 B1 * | 2/2001 | Robinson | ............... | 451/415 |
| 6,186,867 B1 * | 2/2001 | Dwyer | ............... | 451/28 |
| 6,241,595 B1 * | 6/2001 | Skinner | ............... | 451/419 |
| 6,302,625 B1 | 10/2001 | Carey | | |
| 6,709,319 B2 * | 3/2004 | Yan | ............... | 451/70 |
| 7,766,726 B2 * | 8/2010 | Sherlock et al. | ............... | 451/121 |
| 2008/0045126 A1 * | 2/2008 | Rieth | ............... | 451/294 |
| 2013/0225055 A1 * | 8/2013 | Ng et al. | ............... | 451/548 |
| 2013/0295824 A1 * | 11/2013 | Hasegawa | ............... | 451/349 |

FOREIGN PATENT DOCUMENTS

DE    102011102543 A1    11/2012
EP    0514604 A2    11/1992

OTHER PUBLICATIONS

Search Report and Written Opinion from corresponding PCT Application No. PCT/US2013/025255, dated Apr. 2, 2013.

* cited by examiner

*Primary Examiner* — George Nguyen
(74) *Attorney, Agent, or Firm* — General Electric Company; William Scott Andes (57) ABSTRACT

A tool for in-situ airfoil contouring is provided. The tool has a pathway for an airfoil edge wherein the edge movement is limited and further wherein the edge is exposed to a grinding structure having a preselected profile shape therein. The tool makes this contouring process available for airfoils without the necessity of removing the airfoils from, for example, an aircraft engine.

17 Claims, 7 Drawing Sheets

IN-SITU AIRFOIL CONTOURING TOOL

BACKGROUND

The disclosed embodiments generally pertain to a contouring tool. More specifically disclosed embodiments pertain to a contouring tool for a leading or trailing edge of an airfoil.

SUMMARY

According to at least one embodiment, an in-situ airfoil contouring tool is provided. The tool provides a contouring, recontouring or reconditioning device for leading or trailing edges of airfoils used in a variety of industrial applications. The tool comprises a housing having an airfoil pathway. A grinding wheel disposed along the pathway has a desired profile shape of an airfoil edge. A guide bearing follows the edge of the airfoil and limits motion of the grinding wheel in a first dimension. An edge guide allows motion of the airfoil relative to the grinding wheel through a second dimension.

According to at least one exemplary embodiment, the contouring tool is a handheld device.

According to at least one exemplary embodiment, the contouring tool comprises a motor to drive the grinding wheel.

According to at least one exemplary embodiment at least one edge guide is moveable.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this invention, and the manner of attaining them, will become more apparent and the contouring tool will be better understood by reference to the following description of embodiments taken in conjunction with the accompanying drawings, wherein.

DETAILED DESCRIPTION

Referring initially to FIGS. 1 through 9, embodiments of a contouring tool are shown and described wherein the tool may be utilized to contour an edge, for example leading edge, of an airfoil, which typically erodes due to exposure to dirt, water and air over time which all erode the desired shape of the airfoil over time. The terms contouring and recontouring are used interchangeably as it should be understood from this disclosure that the tool may be used for both new airfoil edge contouring or recontouring of an existing airfoil edge. Further the term leading edge is used thought this disclosure and is descriptive of merely one type of airfoil edge which may be contoured. Trailing edges may also be contoured and are within the scope of this disclosure as well. Thus the term leading should not be considered limiting but merely exemplary.

Figure 1:
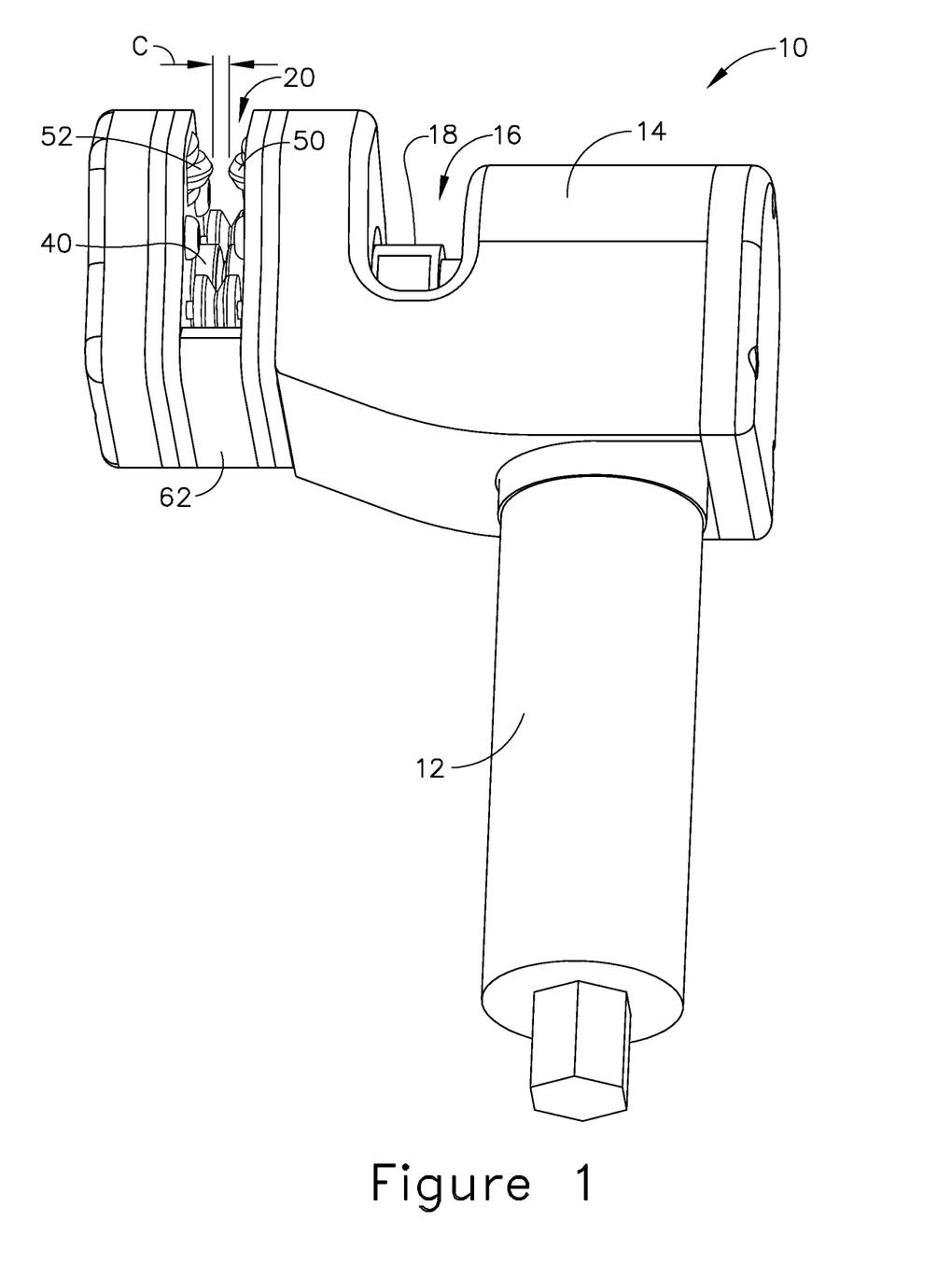
FIG. 1 is a perspective view of one embodiment of a contouring tool.

Referring initially to FIG. 1, a perspective view of the contouring tool 10 is depicted. The structure includes a handle 12 and a housing or cover 14. The tool 10 may be handheld or alternatively may be non-handheld such as attached to a fixture, jig or a robot, all of which being non-limiting examples. The instant embodiment utilizes a motor (not shown) in the handle 12 and a right angle drive structure operably connected to the motor to drive a grinding structure, such as a grinding wheel, 40. A main drive shaft 42 (FIG. 2) is perpendicular to the motor axis (not shown) and the main drive shaft transmits rotation from the motor to the grinding wheel 40. Although this structure is shown and described, a right angle drive is not necessary for use of this invention and alternative embodiments may be used. Thus, the embodiment described herein should not be considered limiting. Additionally, the description of a driven grinding structure should not be considered limiting as stationary or non-driven grinding structures are also believed to be within the scope of the instant invention.

The housing 14 includes a chuck access 16 wherein a chuck 18 is positioned. The chuck 18 provides a drive connection between the motor (not shown) and the drive shaft 42 of the grinding wheel, described further herein. The housing 14 includes an airfoil pathway 20 wherein various guides and the grinding structure are positioned. An airfoil 92 (FIG. 4) is positioned within the pathway 20 and positioned by the guides so that the exemplary airfoil edge 94 (FIG. 4) is ground to the proper shape and at the proper location of the airfoil.

A clearance C is represented as a distance between guide bearings 50, 52. The guide bearings 50, 52 inhibit rocking or side-to-side motion of the edge 94 within the pathway 20 and additionally inhibit use of the tool with airfoil which are of too large a size for the tool 10. The guide bearings may be fixed, spring loaded or otherwise biased, adjustable or any combination thereof to accommodate multiple sizes and shapes of airfoils.

Figure 2:
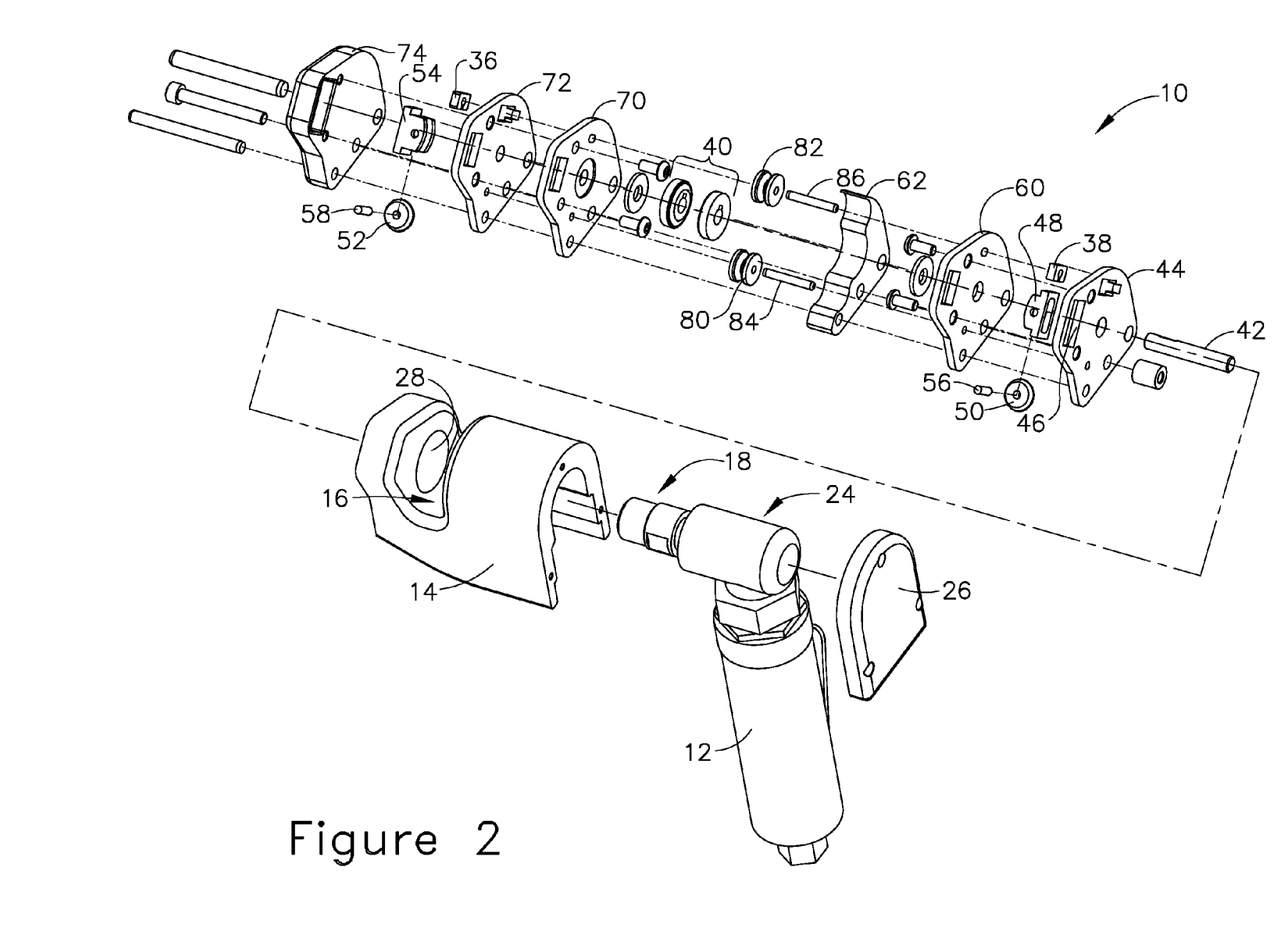
FIG. 2 is an exploded perspective view of the exemplary embodiment of the contouring tool.

Referring now to FIG. 2, the contouring tool 10 is shown in an exploded perspective view for identification and explanation of the multiple guides, bearings and at least one grinding wheel utilized therein. Adjacent handle 12 is an actuator 22 which actuates the motor (not shown). The motor may be various types of driving mechanisms including, but not limited to, electric motor, hydraulic motor, or pneumatic motor. The motor drives a grinding structure 40, such as for example a grind wheel 40, and a transmission 24 including the chuck 18. The chuck 18 operably connects a drive shaft 42 to the grind wheel 40. The grind structure 40 may have an RPM in the range of between 0 and 20,000 revolutions per minute (RPM). Accordingly, the motor may have a range of between 0 and 20,000 RPM with a transmission suited to provide the desired speed or RPM at the grinding wheel 40. At an upper end of the handle, the chuck 18 and transmission may be at least partially covered by the housing 14 and a housing plate 26. It should be understood that the housing may or may not include a portion that defines at least some portion of the handle 12. The housing or cover 14 provides access by way of the chuck access 16 to the chuck 18 for connection or disconnection of the main drive shaft 42 to the motor within the handle 12. The housing 14 includes a drive shaft passage 28 allowing connection or engagement with the chuck 18.

The grinding structure 40 may be formed of a tool steel or other high strength metal with a cubic boron nitride abrasive material. However, other materials may be utilized and the exemplary materials should not be considered limiting. The airfoils may be formed of titanium and alternatively may be formed of specialty alloys, such as an austenitic nickel-chromium-based alloy which is sold under the trade name INCONEL. Other non-metallic airfoils may be utilized with the tool and any reference to an airfoil should not be considered limited to metallc structures.

Moving to the right-hand side of the figure, the main drive shaft 42 is shown with broken line extending to the chuck 18. Adjacent the main shaft 42 is a first mounting plate 44 having apertures for multiple fasteners and shaft aperture allowing passage of the drive shaft 42. The mounting plate 44 includes aperture 46 for positioning of block 48 therethrough. The block 48 is a mount for the guide bearing 50. Adjacent the bearing block 48 is a second mounting plate 60. The second mounting plate 60 includes a block aperture corresponding in position to the aperture 46 and allowing a portion of the block 48 to pass therethrough so that the guide bearing 50 is exposed to pathway 20. Opposite a center spacer 62 are opposed third and fourth mounting plates 70, 72 and an opposed cover plate 74. These structures attach to the housing 14 and define the pathway 20.

The guide bearings 50, 52 are oriented so that pivot shafts 56, 58 are substantially transverse to the drive shaft 42 of the grinding wheel 40. The guide bearing 50, 52 position the airfoil laterally within the airfoil pathway 20 (FIG. 1) and limit or inhibit movement in the axial direction of the main driveshaft 42, as well as locking or pivoting motion along the upper edge of the airfoil 92 where a grinding may occur. The guide bearings 50, 52 may both be fixed or alternatively one or both bearings 50, 52 may be movable to vary with varying widths of airfoils.

Referring above the center spacer 62 are airfoil edge guides 80, 82, for example leading edge guides. The airfoil edge guides 80, 82 allow motion in a direction which is generally transverse to the drive shaft 42 and travel along the edge of the airfoil 92. The guides 80, 82 have pivot axes which are parallel to the main drive shaft 42. Thus, the axes of the airfoil edge guide 80, 82 are parallel to the axis of the grinding wheel 40. The guides 80, 82 define two points along the airfoil edge of the airfoil 92 between which the grinding wheel 40 is contouring or recontouring at any moment during operation. Access to guide bearings 50, 52 limit motion in a first dimension and airfoil edge guides 80, 82 allow for motion in a second dimension generally perpendicular there the first dimension. One of the edge guides 80, 82 is designed to float or move to allow for some rocking motion of the grinding wheel 40 in the direction of the airfoil edge while moving along the edge 94 of the airfoil 92. However, such rocking motion is not considered to be limiting as both edge guides 80, 82 may be fixed and therefore inhibiting such rocking motion.

Figure 3:
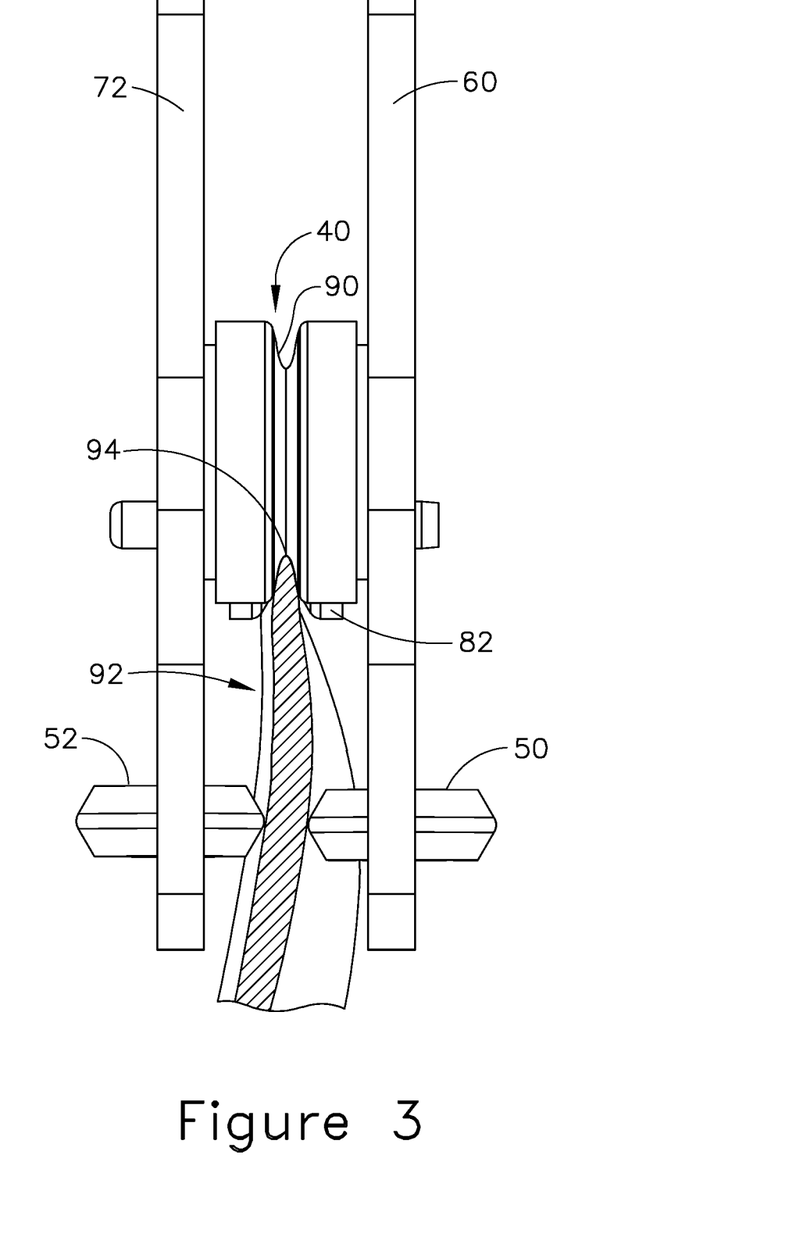
FIG. 3 is a side view of the engagement of an airfoil passing through the exemplary contouring tool wherein an airfoil edge is engaging the grinding wheel.

Referring now to FIG. 3, an exemplary edge 94 of an airfoil 92 is shown in section as indicated by the cross-hatch in the view. The tool 10 moves into or out of the page, in the view depicted. The grinding wheel 40 is shown having a central profile 90 which matches the desired or preselected shape of the airfoil. More specifically, the edge 94 of the airfoil 92 is disposed within the profile 90 of the grinding wheel 40 to grind the edge 94 as the tool passes there along. According to the instant embodiment the grinding wheel 40 is formed of two wheels which are placed together in order to form the airflow profile. The grinding wheel 40 may alternatively be formed of a single grinding wheel structure having the desired profile showed therein or may be formed to more pieces which are joined together along the drive shaft 42 (FIG. 2) in order to provide the preselected airfoil edge shape.

The exemplary airfoil 92 is shown with a camber or twist causing one side of the airfoil to appear wider than the other. As seen in this view, the guide bearing 50, 52 limit motion or pivoting at the edge 94 of the airfoil 92 so that the edge shape is not inappropriately ground in an undesired location of the airfoil 92.

As also shown in FIG. 3, the further guide wheel 82 is positioned over the edge 94 such that the grinding wheel 40 and profile 92 form the preselected airfoil shape on the edge thereof. The edge guide 82 allows for motion into the page while the guide bearing 50, 52 limit motion in a transverse direction.

Figure 4:
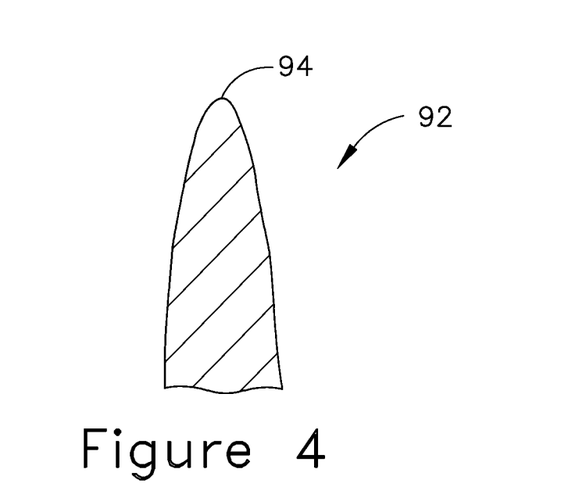
FIG. 4 is a side section view of an edge of an airfoil.

Referring now to FIG. 4, a section view of a turbine engine airfoil 92 is depicted. The shape of the airfoil 92 is after the tool 10 is used and the eroded areas are removed by way of the grinding wheel 40 and profile 90 therein.

Figure 5:
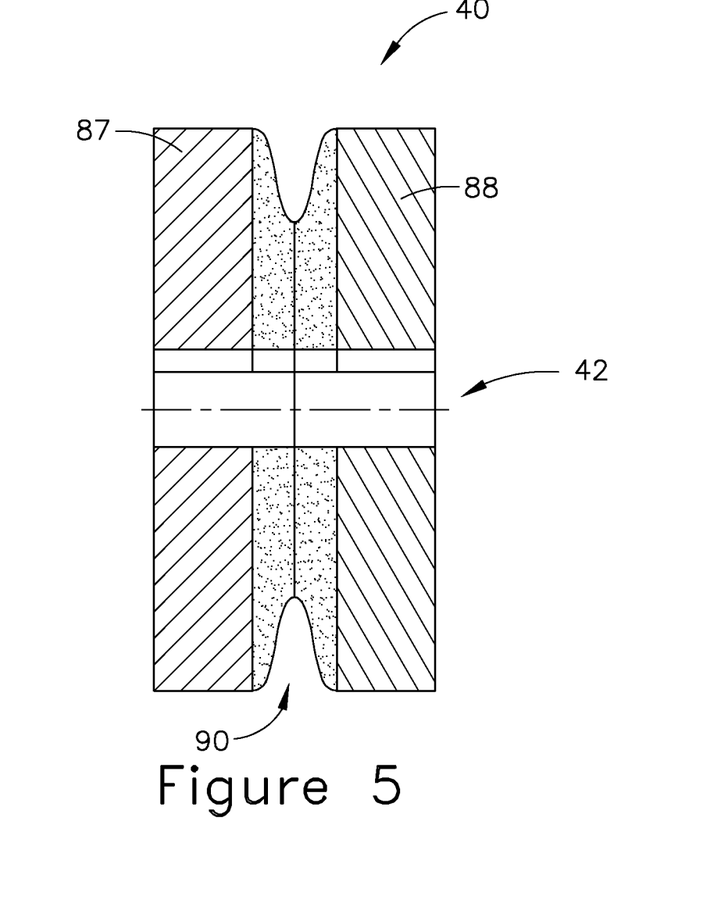
FIG. 5 is a section view of a grinding wheel having the preselected shape of the desired airfoil.

Referring now to FIG. 5, a section view of the exemplary grinding structure 40 is depicted comprising a first portion 87 and a second portion 88. Alternate embodiments should be considered within the scope of the embodiments wherein the grinding wheel 48 is formed of a single piece rather than the two or more portions. A profile 90 extends about the axis of the grind wheel 40 and an aperture extends through the grinding wheel 40 for positioning of the drive shaft 40 therethrough. The grinding wheel 40 rotates about this shaft 42 and shaft aperture. The profile 90 may be symmetrical or non-symmetrical depending on the airfoil edge shape needed.

Figure 6:
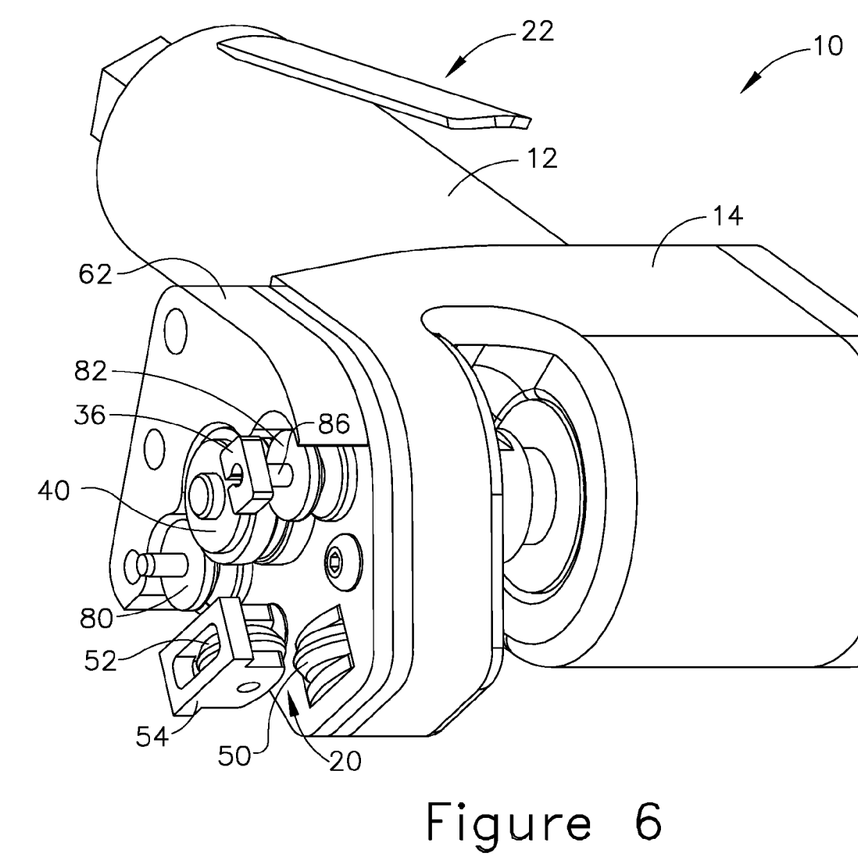
FIG. 6 is an upper perspective view of the contouring tool depicted with an end plate removed to depict the guides therein.

Referring now to FIG. 6, the contouring tool 10 is shown in an upper perspective view. With cover plate 74 removed, the edge guides 80, 82, the grinding wheel 40 and the guide bearings 50, 52 are easily visible adjacent the center spacer 62. Disclosed in this view, the airflow will be positioned within the pathway or passage 20 between the guide bearings 50, 52. These bearings inhibit movement to the left or right, as shown in the figure. The edge guides 80, 82 ride along the edge, for example, leading edge 94 of the airfoil 92 (FIG. 4) and the edge 94 of the airfoil is positioned in the grinding profile 90 of the grinding structure 40 so that the airfoil 92 conforms to the profile 90 shape placed therein. Thus, it should be understood that the preselected shape of the profile 90 may be duplicable to a specific airfoil or multiple airfoils by merely adjusting the guides, bearings and grinding structure. However, whatever shape is desired should be applied to the proper or corresponding airfoil. FIG. 6 further depicts a floating block 36 which retains ends of shafts 86 and which allows the edge guide 82 to move. The movement allows for some limited rocking motion by the tool 10 during movement along the edge 94 of the airfoil 92 in a direction extending between the edge guides 80, 82. In operation, the edge guide 82 will move toward or away from the center spacer 62 when the rocking motion occurs while shaft 84 and guide 80 remain fixed. Alternatively, the block 36 may be fixed so that shaft 86 cannot move and edge guide 82 is also fixed inhibiting the rocking motion.

Figure 7:
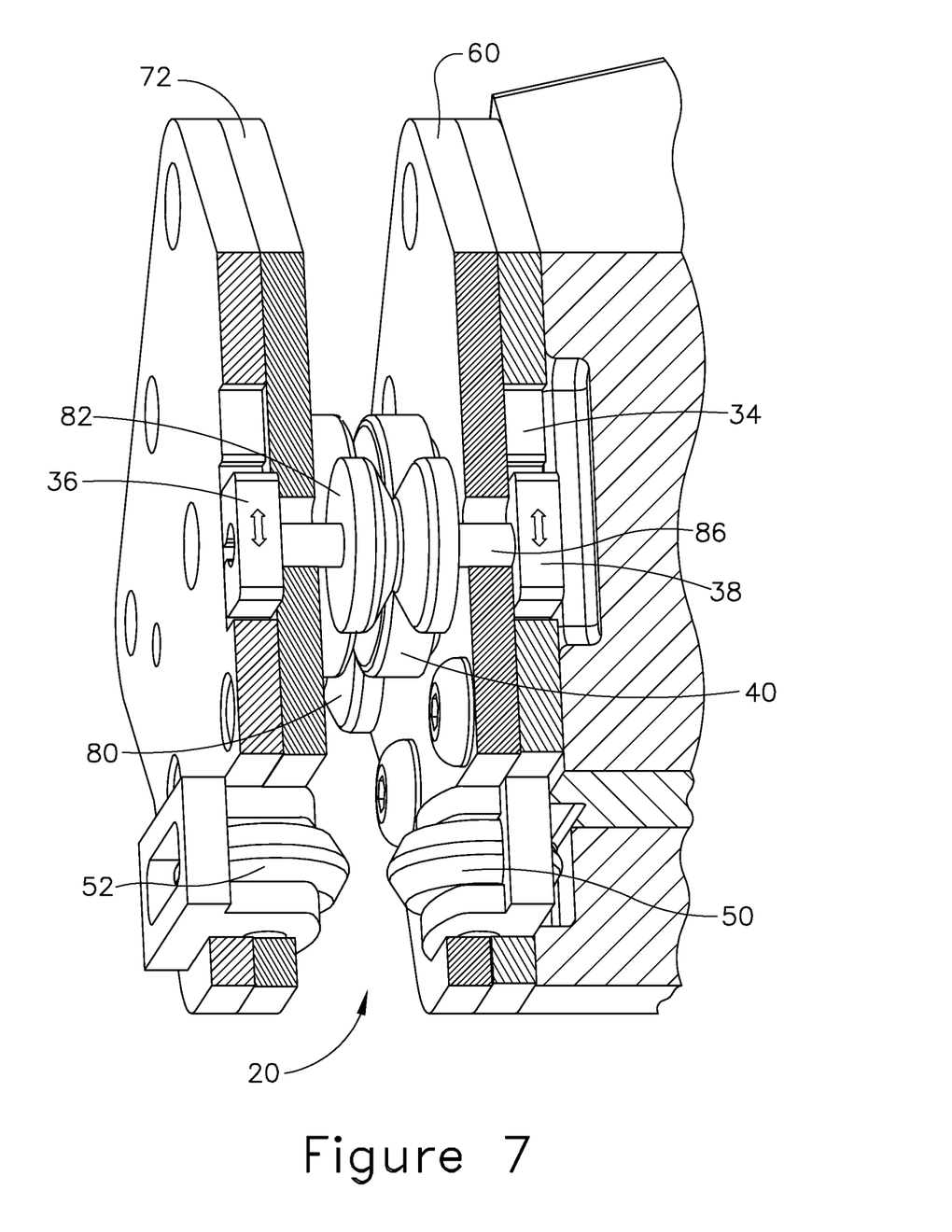
FIG. 7 is a section view of the contouring tool showing embodiments of the various guides bearings, edge guides, and grind wheel.

Referring now to FIG. 7, the floating blocks 36, 38 are shown and depict adjacent material sectioned for the clear perspective view. A slot 34 is positioned in the mounting plate 60, 72. The slot 34 allows vertical movement of the floating blocks 36, 38 so that shaft 86 can move in the directions shown by the arrows on the floating blocks 36, 38. As shown in the figure, the pathway 20 allows for positioning upwardly through pathway 20 between the guide bearing 50, 52 and into the adjacent grinding wheel 40. The airfoil edge 94 is positioned in the edge guides 80, 82 and the, for example, leading edge may be moved in the direction into or out of the page while the grinding wheel rotates and grinds the edge 94 of the airfoil 92 therein. The guide bearings 50, 52 inhibit left right motion or rocking motion along the edge of the airfoil so that the guide bearing 50, 52 limits motion in a first direction and the edge guides allow motion in a substantially transverse direction.

Figure 8:
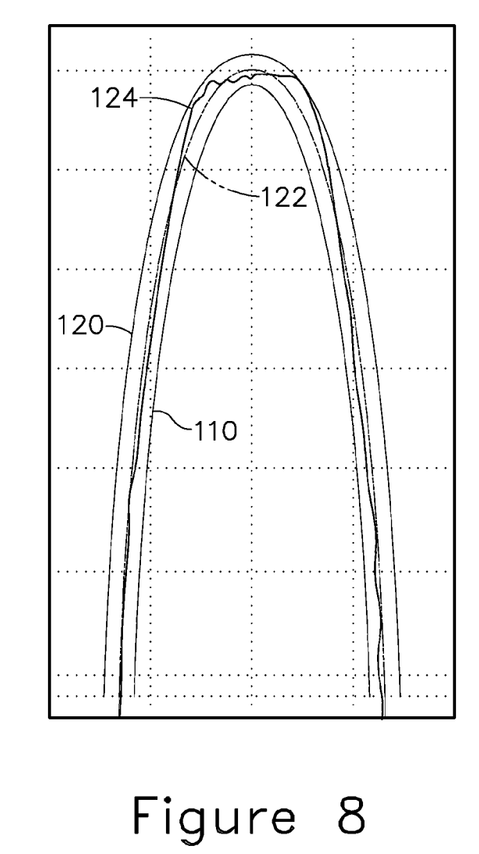
FIG. 8 is an exemplary graph depicting an eroded airfoil edge which falls outside acceptable tolerances.
Figure 9:
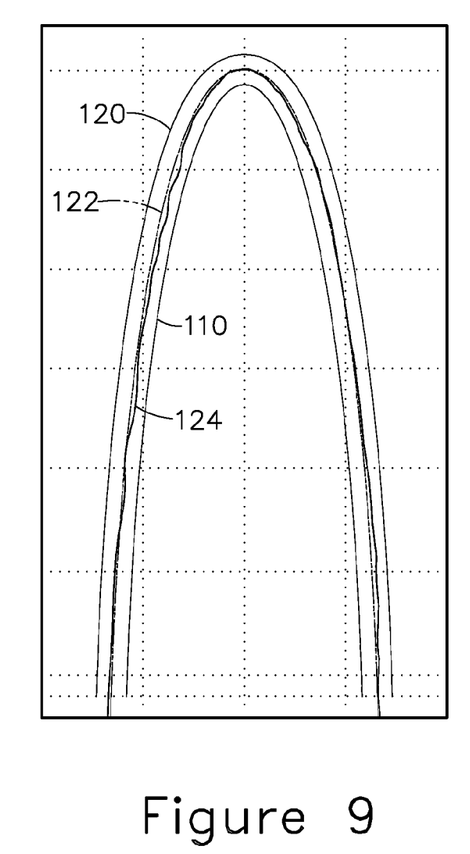
FIG. 9 is an exemplary graph depicting the contoured airfoil edge of FIG. 8 after contouring.

Referring now to FIGS. 8 and 9, first and second graphs are shown comparing an airfoil edge profile prior to grinding and subsequent to grinding with the contouring tool, respectively. These graphical representations depict the change in shape of the edge due to erosion and due to use of the re-contouring tool. In FIG. 8, a first line 110 represents a minimum tolerance of the shape of the airfoil edge. A second parallel line 120 represents a maximum tolerance. A third broken line 122 depicts a nominal shape for an airfoil edge. A fourth line 124 indicates the flattened or otherwise misshaped portions where erosion has taken a detrimental toll on the shape of the edge. This results in loss of proper shape and decreased engine thrust for aircraft engines despite periodic overhauls of the engine structure.

Following use of the exemplary embodied tool 10, and with reference to FIG. 9, the line 124 representing the shape of the edge 94 more closely matches the nominal shape of line 122. As a result, the shape of the edge is within the minimum and maximum tolerances 110, 120 and more closely approximates the nominal desired shape. As a result, the thrust provided by this contoured or recontoured airfoil will be increased as opposed to that in FIG. 8 due to the erosion damage.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An airfoil edge contouring tool, comprising:
   a housing having a pathway for an airfoil;
   a grinding structure having a desired shape of an airfoil edge;
   a guide bearing which follows said airfoil edge and limits motion of said grinding structure in a first dimension;
   an edge guide which allows motion of said grinding structure in a second dimension;
   said edge guide being a first wheel and a second wheel.

2. The contouring tool of claim 1 wherein said guide bearing limits lateral motion of said grinding structure relative to said airfoil.

3. The contouring tool of claim 1 wherein said guide bearing comprises a first bearing and a second bearing.

4. The contouring tool of claim 1 wherein one of said first and second wheels is stationary and the other of said first and second wheels is floating.

5. The contouring tool of claim 1 wherein said first wheel and said second wheel guide said tool along said airfoil edge.

6. The contouring tool of claim 1 further comprising a motor.

7. The contouring tool of claim 6 wherein said motor is one of pneumatic, hydraulic or electric.

8. The contouring tool of claim 6 wherein said motor is drivingly connected to said grinding structure.

9. The contouring tool of claim 1 wherein said contouring tool is handheld.

10. An airfoil edge contouring tool, comprising:
    a housing having a location with an exposed grinding wheel, said exposed grinding wheel having a preselected shape for an edge of an airfoil;

a guide bearing which limits pivoting of said grinding wheel on said edge of said airfoil, said guide bearing being exposed from said housing and wherein said guide bearing rotates;

an edge guide allowing guided movement of said grinding wheel along said edge of said airfoil.

11. The airfoil contouring tool of claim 10 further comprising a motor operably connected to said grinding wheel.

12. The airfoil contouring tool of claim 10 wherein said grinding wheel is formed of two wheels.

13. The airfoil contouring tool of claim 12 wherein said two wheels each define a portion of said preselected shape.

14. The airfoil contouring tool of claim 10 wherein said guide bearing comprises two bearings.

15. The airfoil contouring tool of claim 10 wherein said edge guide guides movement of said tool along said airfoil edge.

16. The airfoil contouring tool of claim 10 wherein said tool is handheld.

17. An airfoil contouring tool, comprising:

a housing having a motor therein and a grinding wheel operably connected to said motor;

a guide bearing limiting at least one of rotation or lateral motion of said grinding wheel relative to said airfoil edge in a first direction;

an airfoil edge guide which guides movement of said tool along said airfoil edge in a second direction generally perpendicular to said first direction;

said edge guide being a first wheel and a second wheel;

said grinding wheel having a desired airfoil profile shape.

* * * * *